United States Patent [19]

Farrar et al.

[11] Patent Number: 4,950,747
[45] Date of Patent: Aug. 21, 1990

[54] POLYSACCHARIDES

[75] Inventors: David Farrar; Peter Flesher; Kenneth C. Symes, all of West Yorkshire, England

[73] Assignee: Allied Colloids Ltd., United Kingdom

[21] Appl. No.: 173,946

[22] Filed: Mar. 28, 1988

Related U.S. Application Data

[60] Continuation-in-part of Ser. No. 111,148, Oct. 20, 1987, abandoned, which is a continuation of Ser. No. 796,158, Nov. 8, 1985, abandoned, which is a division of Ser. No. 609,681, May 14, 1984, Pat. No. 4,571,422, which is a continuation-in-part of Ser. No. 552,591, Nov. 16, 1983, abandoned.

[30] Foreign Application Priority Data

| | | | |
|---|---|---|---|
| May 17, 1983 | [GB] | United Kingdom | 8313521 |
| Sep. 23, 1983 | [GB] | United Kingdom | 8325503 |
| Dec. 23, 1983 | [GB] | United Kingdom | 8334313 |
| Mar. 26, 1987 | [GB] | United Kingdom | 8707250 |

[51] Int. Cl.$^5$ .................. C07H 1/00; C07G 17/001
[52] U.S. Cl. .................................. 536/124; 536/114
[58] Field of Search .............................. 536/124, 114

[56] References Cited

U.S. PATENT DOCUMENTS 4,053,699 10/1977 Cahalan et al. ............... 536/114
4,571,422 2/1988 Symes et al. ................... 536/114

Primary Examiner—Ronald W. Griffin
Assistant Examiner—Pamela S. Webber
Attorney, Agent, or Firm—Ostrolenk, Faber, Gerb & Soffen

[57] ABSTRACT

When drying an aqueous polysaccharide solution, the viscosification properties are maintained, and often improved, by including a low molecular weight electrolyte in the solution before the drying is completed, and generally before the solution is heated above 50° C.

13 Claims, No Drawings

POLYSACCHARIDES

This application is a continuation-in-part of application Ser. No. 111,148 filed Oct. 20, 1987, now abandoned, which was a continuation of Ser. No. 796,158 of Nov. 8, 1985, now abandoned, which was a division of application Ser. No. 609,681 of May 14, 1984, now U.S. Pat. No. 4,571,422, which was a continuation-in-part of application Ser. No. 552,591, filed Nov. 16, 1983, now abandoned.

Certain polysaccharides can be made by fermentation are known as microbial polysaccharides. The fermentation is conducted in an aqueous fermentation broth which normally has a relatively low concentration, typically up to about 2% by weight, of polysaccharide at the end of the fermentation. Since it is inconvenient to transport and handle such dilute solutions it is normally preferred to convert the polysaccharide to a powder by evaporation of the water.

In common with all polymeric powders, it can then be rather difficult to obtain satisfactory dissolution of the resultant powder in water and it is known to conduct the dissolution in the presence of a dissolving aid that will promote dissolution. Some of the proposed dissolving aids are electrolytes whilst many are non-electrolytes. Various materials are proposed in EP No. 79836, U.S. Pat. No. 4,053,699, GB Nos. 2,076,003 and 2,172,008.

In particular, in GB No. 2,172,008 a non-acid dissolving aid is utilised to aid synthetic polymers (such as polyacrylamide) or polysaccharides (such as xanthan) to dissolve more readily and completely in water than the dry polymers alone. The proposed dissolving aids include various non-ionic polymeric surfactants including sodium lignosulphonate. In every example a dry powdered mixture of the polymer and the dissolving aid is formed by dry blending, but it is mentioned that a blend can be obtained by adding the dissolving aid to a polymer broth and then dehydrating this to form a dry powder. In all these methods the amount of dissolving aid is usually relatively large, for instance between 10% and 100% based on dry polymer in GB No. 2,172,008. It is naturally undesirable, and probably totally unacceptable, to use dissolving aids that are polymeric surfactants in those instances where the presence of the surfactant would be expected to have adverse consequences on the system containing the polymer that is to be dissolved. It is well known that the drying of microbial polysaccharides has to be conducted carefully so as to avoid "hornification", which results in the polysaccharide being rendered wholly or partially insoluble. Hornification tends to follow from exposing the polysaccharide to hot surfaces, such as the surfaces that are necessarily involved when drying a bulk solution. A process that is designed to avoid this is described in EP No. 128661 and this process does give greatly improved product quality. Direct exposure of the polysaccharide solution to hot surfaces is avoided or minimized as a result of dehydrating the solution while emulsified in a non-aqueous liquid.

We have now surprisingly found that, even in this process, heating the microbial polysaccharide solution to quite moderate temperatures is liable to result in permanent damages to the solubility and viscosifying properties of the polysaccharide, but that this damage can be reduced or eliminated by including in the solution, during the heating step, a small amount of electrolyte.

According to the invention a microbial polysaccharide aqueous solution that is a fermentation solution is dehydrated by heating the solution at a temperature above 50° C., and in this process the solution that is being dried includes during some or all of the heating at least 0.5%, based on the dry weight of the polysaccharide, of an electrolyte having a molecular weight below 500.

It is important that the electrolyte should be present during some, and preferably all, of the heating. Mere addition of the electrolyte to the dried product after the heating does not give the benefits of the invention. Thus the invention is in complete contrast to, for instance, the exemplified processes in GB No. 2172008.

Whereas in the prior art, the incorporation of the electrolyte or other dissolution promoter is effected merely to help attain the viscosification properties possessed by the dried polymer (e.g. by avoiding aggregation of the polymer particles), in the invention the presence of the electrolyte surprisingly increases the potential viscosification properties of the polymer. Thus the electrolyte is not present merely to help achieve the potential viscosification properties but is, instead, present to increase the potential viscosification properties.

Drying of a microbial polysaccharide is always assumed to cause some deterioration in the potential viscosification properties of that polysaccharide. However we have found that it is, surprisingly, easy to perform the invention in such a way as to give a dried polysaccharide having potential viscosification properties that are better than the undried. Thus, one can start with the raw microbial polysaccharide (which one would assume to have the maximum potential viscosification properties) subjected to heating in accordance with the invention and produce a dried product that has better viscosification properties than the raw starting material.

Accordingly in the invention the low molecular weight electrolyte is not present merely as a dissolving aid but instead is present to prevent damage during the drying and, in particular, even to improve the properties of the product relative to the starting material. Addition of the low molecular weight electrolyte after drying cannot give these benefits since the inevitable drying damage will, by then, already have occurred and cannot be repaired merely by adding electrolyte.

The amount of electrolyte is generally quite low compared to the amount of dissolving aids that have traditionally been added to previously dried polymer. Thus the amount is usually below 20% and frequently below 12% based on the dry weight of polysaccharide. Generally it is unnecessary to use more than 10%. Normally the amount is at least 1% and often at least 2%. Amounts in the range of about 5 to about 10% are often preferred.

The electrolyte must be added before there has been substantial permanent damage to the properties of the polysaccharide. Accordingly it must be added at some stage earlier than at the end of prolonged exposure to a high temperature. For instance it can be added quickly after the polysaccharide reaches a temperature at which damage could occur, provided the addition is made before damage has occurred at that temperature, but generally the electrolyte is present in the solution before the solution reaches a temperature at which significant damage may occur. Generally it is present before the solution reaches a temperature of 80° C., and preferably before the solution reaches a temperature of 60° C. The temperature of the solution preferably does not exceed 120° C., preferably 100° C. Preferably the polysaccharide never exceeds such temperatures, even on a microscale.

The electrolyte is preferably added to a dilute solution of the polysaccharide while that solution has a temperature below 50° or 60° C.

The solution to which the electrolyte is added is a fermentation solution, by which we mean that the polysaccharide has remained in dissolved form since it was produced by fermentation as a broth and has not been converted to a solid form. The fermentation solution is normally a solution obtained by purifying a fermentation broth. The purification is generally conducted to remove cellular debris and also to remove any low amounts of dissolved, non-polysaccharide, components that are present during the fermentation, e.g., nutrients. The solution may have been subjected to a preliminary concentration step, e.g., during the purification process. Thus although the solution that is used as the starting material in the invention can have a very low polysaccharide concentration, e.g., 2% or lower, it is preferred that it has a polysaccharide content of at least about 6% and generally below about 20%, typically 7 to 12%. The purified solution is normally substantially wholly free of electrolyte prior to the addition of the electrolyte that is incorporated for the purposes of the invention.

The fermentation broth can have been made by fermentation in an aqueous phase dispersed in oil, followed by separation of the aqueous phase from the oil, but generally is made by fermentation in a bulk aqueous medium in known manner.

The microbial polysaccharide can be any polysaccharide that can be made by fermentation but is generally a xanthan, pseudomonas, arthrobacter or scleroglucan gum.

The dehydration can be conducted in any convenient manner that involves heating the solution. In one suitable method it is spray dried, for instance as described in EP No. 180366.

The preferred method involves emulsifying the aqueous solution in a non-aqueous liquid and then drying the emulsion, for instance as described in EP 128661. It is very surprising that the results obtainable by azeotropic distillation of emulsified solution are better when the solution contains electrolyte than when it is free of electrolyte.

The preferred method therefore comprises emulsifying a purified aqueous concentrate obtained from the fermentation broth into a non-aqueous liquid using dispersion promoter selected from surfactants and stabilisers and then drying the resultant emulsion by azeotroping initially at low temperature but with a gradual increase in temperature to a temperature above 60° C., preferably using materials and process conditions as described in detail in EP No. 128661. The product of the process is a dispersion of dried polysaccharide particles in non-aqueous liquid. The polymer content may be, for instance, 50% by weight based on aqueous particles but preferably the particles are substantially dry.

The electrolyte must not have surfactant properties since, if it does, these properties are liable to interfere with the properties of the final product and may interfere with the process. In particular, the inclusion of a surfactant in a polysaccharide solution that is to be emulsified, as described in EP No. 128661 is highly undesirable. The achievement of a stable emulsion as in EP No. 128661 requires the selection of dispersion promoters in known manner using materials that are selected to give the desired stability and other properties. The addition of a surfactant, for an entirely different purpose, is liable to interfere with the stabilisation of the emulsion and may indeed result in destabilisation of the emulsion, so that the process becomes inoperative. Thus polyethyleneoxide surfactants and polyphenolic surfactants (such as the lignosulphonates) must therefore be avoided.

It is sometimes possible to obtain some benefits from the use, as electrolyte, of a water-soluble anionic polymer having low molecular weight, for instance a polymer having a molecular weight of 1,000 to 2,000 and formed from acrylic acid or other ethylenically unsaturated anionic monomer, optionally with nonionic monomer. However best results are achieved when the electrolyte has molecular weight below about 500. Such electrolytes do not have surfactant properties and it is easily possible to select such electrolytes that will not have adverse effects on the stability of any emulsion of fermentation broth in nonaqueous liquid.

The product of the invention is generally used for viscosifying an aqueous solution which is frequently a down-hole solution that can be fresh water or a brine. The choice of the optimum electrolyte is influenced to some extent by the content of the dissolution water. In particular, the presence of significant amount of a polyvalent metal compound, for instance a calcium salt, in the dissolution water can restrict the electrolytes that are suitable, since some electrolytes may react with the compound to form a precipitate that interferes with the viscosification. Also, the choice of the electrolyte can be influenced by the method of forming the viscosified solution. For instance when viscosification of water is effected by dispersing into the water a dispersion of the dried polysaccharide in non aqueous liquid, it is often convenient to perform this process in the presence of an oil in water emulsifying agent, which is frequently included in the dispersion. This general technique is well known. In some instances it is found that the amount of oil in water emulsifying agent influences the choice of the optimum electrolyte.

One group of electrolytes that can be used are salts (usually alkali metal salts and especially sodium salts), or organic acids such as acetic acid and citric acid. These electrolytes are reasonably tolerant of polyvalent metal compounds in the dissolution water and are reasonably tolerant of variations in the methods of activating an emulsion into the water.

When the water is fresh water satisfactory results can be obtained with simple phosphates, such as alkali metal salts of phosphoric acid, generally disodium hydrogen phosphate, but these are much less satisfactory when the dissolution water contains polyvalent metal compounds. It seems that, for instance, calcium phosphate is precipitated during the dissolution of the polysaccharide, and this precipitation interferes with the viscosification properties of the polysaccharide.

Strong electrolytes, in particular sodium chloride or other alkali metal chloride, are tolerant of high polyvalent metal concentrations in the dissolution water and so are particularly preferred when the polysaccharide is to viscosify relatively hard and/or high salinity brines. When using such electrolytes it is preferable to use some oil in water emulsifier as activator, in order to obtain optimum properties.

A particularly preferred electrolyte, especially when a dissolution water is a low salinity brine is sodium tripolyphosphate (or other water soluble tripolyphosphate salt).

It is thought that the electrolyte may stabilize the polysaccharide by having a beneficial effect on the packing of the polysaccharide chains. This effect may also be improving the subsequent rate of dissolution when the product is used as a viscosifier. The organic acid and tripolyphosphate salts are though to act in that way. Also the incorporation of electrolyte into the particles of polysaccharide, especially substantially dry particles increase the rate of dissolution of the product by encouraging water to enter the particles on addition of the product to water, by osmosis. Low molecular weight (per ionic charge) electrolytes such as sodium chloride or tripolyphosphate give high ionic strength within the particles to increase that effect.

Within this specification we consider low salinity brines as generally containing less than 1% bivalent metal such as calcium or magnesium (usually as chloride) and preferably less than 3% monovalent metal (generally sodium chloride), although similar effects can be obtained when the polyvalent metal content is within this range but the sodium chloride content is relatively high, e.g. to 30%.

High salinity brines are those having a multivalent and/or monovalent metal ions higher than sea water i.e. more than a total of 3% of salt and often as high as 25 to 30%.

We regard hard brines as those having a high content of multivalent metal compound, for instance above 0.1% calcium chloride (the usual amount of such compounds in seawater). Sometimes these solutions contain very high amounts of these metals e.g. above 10% calcium chloride, e.g. 28% calcium chloride solutions.

In this specification, viscosification performance is compared by dissolving equal amounts (dry weight) polysaccharide in the appropriate solution and determining the maximum viscosity obtainable at that concentration.

The dehydration can be conducted to form a concentrated solution, e.g., having more than 50% polysaccharide by weight of the solution, but preferably is conducted to form a substantially dry product that can be left as a dispersion or can be provided as a powder, e.g., as described in EP Nos. 128661 and 180366. Preferably the dehydration is effected by azeotroping, for instance as described in EP No. 128661.

EXAMPLE 1

4 g sodium tripolyphosphate is dissolved in 1 kg of the product sold by Shell under the trade name Shellflo XA (containing 7.6% xanthan and free of formaldehyde) and this solution is emulsified in non-aqueous liquid suing dispersion stabiliser and azeotropic distillation conditions (incurring reduced pressure distillation at around 20° C. followed by continued distillation up to 95° C.) all as described in EP 128661.

A control dispersion is made by the same technique but omitting the sodium tripolyphosphate.

The test dispersion of the invention and the control dispersion are each stirred into low salinity brine at a polymer addition of 0.3% and the viscosity of the brine is recorded at various times. Viscosity is also recorded when adding the starting solution of Shellflo XA in an amount to provide 0.3% xanthan. The results are shown in the following table.

| Time | 10 min | 20 min | 30 min | 17 hours |
|---|---|---|---|---|
| Control | 834 | 937 | 948 | 1082 |
| Test | 937 | 968 | 968 | 1143 |
| Shellflo XA | 21 | 103 | 247 | 1030 |

From this it is apparent that the test composition of the invention builds its viscosity faster than the control composition or the starting solution and gives a final viscosity that is higher than either the control or the starting solution.

When the process of this example was repeated using a similar technique but different batches of xanthan broth, either with or without an oil in water emulsifier as activator, the viscosity of the 0.3 solution in low saline brine of 1% sodium chloride, 0.1% calcium chloride concentration or of synthetic ocean water (2.3% calcium chloride concentration or of synthetic ocean water (2.3% sodium chloride, 0.5% magnesium chloride and 0.1% calcium chloride) varied from 100%, in the lowest instance, up to 121% (giving a mean of 111%) based on the viscosity obtained by using the same dry weight of untreated starting broth (the "theoretical yield")

EXAMPLE 2

Aqueous disodium hydrogen phosphate is stirred into a preformed emulsion in oil of aqueous xanthan, formed as described in EP No. 128661 at an amount of 4% based on the dry weight of xanthan. The resultant dispersion was vacuum distilled at 14 mm Hg for 30° C. until the distillate contained no further water and was then allowed to rise to 80° C. while pure solvent was distilling. The vacuum was released and the mixture stirred at a temperature between 80° and 95° C. for 5 hours, whereafter the concentrated dispersion, having a xanthan content of 52%, was cooled.

The final product was dispersed into fresh water and its viscosity was recorded at varying times. The viscosity was 77% of theoretical after 5 minutes and 86% of theoretical after 20 minutes, compared to values of about 57% and 80% for the corresponding product made without the sodium phosphate addition.

EXAMPLE 3

A process broadly as described in Example 1 is repeated using sodium chloride instead of sodium tripolyphosphate. Good viscosification is obtained in 28% calcium chloride solution when the emulsion contains oil in water emulsifier, but rather poor viscosification in the absence of this emulsifier.

EXAMPLE 4

The process of Example 1 is repeated to produce dispersions of aqueous xanthan, but containing sodium chloride in place of the sodium tripolyphosphate, and containing 1% or 5% of an oil in water emulsifier as activator. The dispersions were tested for viscosity building characteristics in a strong brine (SB) (25% NaCl, 0.1% $MgCL_2$ and 0.1% $CaCl_2$). The control was as for Example 1.

The values of the final viscosity yield (i.e. after 17–24 hours) as percentages of the theoretical yield were reported together with the time taken for the brines to reach 80% of the theoretical viscosity (t80).

The results show that the final viscosity yield for the test as compared to the control was little different but that the time to develop the viscosity was greatly improved by the incorporation of sodium chloride. The results are as follows:

| % activator | t80 mins control | test |
|---|---|---|
| 1 | 30 | 24 |
| 5 | 22 | 13 |

These results show that the incorporation of the sodium chloride could be accompanied by a reduction of the amount of activator necessary to give acceptable development times. For instance with a reduction from 5 to 1% activator the incorporation of sodium chloride will maintain the quick viscosifying time.

EXAMPLE 5

Example 4 was repeated but using sodium citrate and sodium acetate but tests were also carried out on the low salinity brine and synthetic ocean water. Both these salts gave improved t80 values as compared to the control. The improvements were particularly apparent in the strong brine.

We claim:

1. In a process in which an emulsion in a non-aqueous liquid of an aqueous solution of microbial polysaccharide selected from the group consisting of xanthan, pseudomonas, anthrobacter and scleroglucan that is a fermentation solution is dehydrated by heating the emulsion at a temperature above 50° C. up to 120° C., the improvement comprising including in the solution, during some or all of the heating above 50° C., at least 0.5% (based on the dry weight of polysaccharide) of an electrolyte having a molecular weight below 500 selected from the group consisting of alkali metal citrate acetates, tripolyphosphates and chlorides.

2. A process according to claim 1 comprising emulsifying a purified concentrate obtained from the fermentation broth into a non-aqueous liquid using a dispersion promoter selected from surfactants and stabilisers, including the electrolyte into the solution before or after the emulisification, and the dehydration of the resultant emulsion is by azeotroping.

3. A process according to claim 2 in which the product is a dispersion of substantially dry polysaccharide particles in non-aqueous liquid.

4. A process according to claim 1 in which the viscosifying properties of the dehydrated polysaccharide solution then dissolved in a liquid selected from fresh water, brine containing less than 1% bivalent metal, brine containing more metal ion than sea water and brine containing more multivalent metal than sea water are greater than the viscosifying properties of the starting fermentation solution when dissolved in that liquid.

5. A process according to claim 1 in which the electrolyte is sodium tripolyphosphate.

6. A process according to claim 1 in which the electrolyte is selected from sodium chloride, sodium citrate and sodium acetate.

7. A process according to claim 1 in which the amount of electrolyte is 1 to 10% based on the dry weight of polysaccharide.

8. A process according to claim 1 in which the electrolyte is included in the solution before the solution is heated above 50° C.

9. A process according to claim 8 in which the amount of electrolyte is 1 to 10% based on the dry weight of polysaccharide.

10. A process according to claim 9 in which the aqueous solution is of xanthan.

11. A process according to claim 10 in which the electrolyte is selected from sodium chloride and sodium citrate, sodium acetate.

12. A process according to claim 10 in which the electrolyte is sodium tripolyphosphate.

13. A process according to claim 1 in which the aqueous solution is of xanthan.

* * * * *